April 8, 1969 A. H. YOUMANS 3,437,169
METHOD AND APPARATUS FOR LOGGING INCLINED EARTH BOREHOLES
Filed Nov. 16, 1966

ARTHUR H. YOUMANS
INVENTOR.

BY *William E. Johnson, Jr.*
ATTORNEY

ARTHUR H. YOUMANS
*INVENTOR.*

BY William E. Johnson, Jr.
*ATTORNEY*

United States Patent Office 3,437,169
Patented Apr. 8, 1969

3,437,169
METHOD AND APPARATUS FOR LOGGING INCLINED EARTH BOREHOLES
Arthur H. Youmans, Houston, Tex., assignor to Dresser Industries, Inc., Dallas, Tex., a corporation of Delaware
Filed Nov. 16, 1966, Ser. No. 594,744
Int. Cl. G01v 1/00
U.S. Cl. 181—.5        2 Claims

ABSTRACT OF THE DISCLOSURE

A well logging instrument having an inclinometer and one or more well logging sections is adapted for travel through an inclined borehole, thus providing a means for yielding true-depth corrected surveys of the formations surrounding a borehole on a single pass of the instrument through the borehole.

---

This invention relates to a system and an apparatus for well logging of bore holes having some degree of inclination. In particular, the invention relates to a well logging system wherein an inclinometer is incorporated with conventional well logging equipment and coupled to surface electronic equipment, thus providing an indication of true vertical depth which can be integrated with the conventional well logging parameters.

In the art of "logging" earth bore holes, that is, obtaining information concerning characteristics of the strata of the earth penetrated by such bore holes, it is well known that, in general, the velocity of acoustic waves through different types of earth formations varies over a wide range of velocities, and that the velocity of an acoustic wave in a given type of formation generally increases with increasing depth below the surface. Thus, it is found to be possible, by comparisons of relative travel times of such waves in different kinds of rocks, to establish criteria or standards by which measurements conducted at locations within a bore hole of the travel time of acoustic waves in the several bore hole-encircling formations may be interpreted or translated into data highly useful in series conducted with a view towards ascertaining the presence or absence of petroleum, gas, water, minerals, or the like in the formations.

It is also well known in the art that other logging parameters may be obtained, such as those associated with neutron lifetimes, resistivity, induction, and the like, such parameters being used to ascertain the different types of earth formations within the bore hole. However, a measurement common to each of these logging parameters is that of depth. There are several types of depth measurements known in the art, for example, the well known method of simply measuring the amount of cable which has been used in lowering the bore hole tool into the ground and compensating for the amount of cable stretch.

The prior art systems, while attempting to establish a depth parameter which was to furnish an indication of depth for a particular logging parameter, do not take into account the various angles of inclination with which the bore hole is at variance with a true vertical line. Bore holes will frequently be deviated from the vertical by two to three degrees and yet sometimes be deviated by approximately seventy degrees from vertical. Thus, the depth measurement which appears in the conventional logging charts associated with the inclined or deviated bore holes is not in fact an indication of true vertical depth. Likewise, any given thickness of a particular stratum is not a true vertical thickness. Furthermore, while one bore hole may be substantially vertical, an adjacent bore hole may have some angle of deviation, thus causing an observer of the logs of the two wells to feel that a given stratum such as, for example, a water reservoir, may not lie in a horizontal plane.

Yet another problem is associated with the logging of inclined boreholes, the problem arising from the fact that certain types of rock formations are not isotropic. Some such types of non-isotropic rocks are observed to exhibit different characteristics when measurements are made on the one hand in a borehole parallel to the bedding planes of the strata and, on the other hand, in a borehole perpendicular to the strata. As an example, it is frequently observed that the measured acoustic velocity of limestone is up to 10 percent greater along the bedding planes than perpendicular thereto. The ratio of the velocity along the layers to the velocity perpendicular to the layers may be defined as the anisotropy factor. Since, in general, the strata penetrated by a borehole are more or less horizontal, normal logging measurements are made perpendicular to the strata. But when the borehole is appreciably slanted, the measurement includes a component parallel to the bedding planes. The greater the anisotropy factor, and the greater the angle of the borehole away from perpendicular, the greater will be the discrepancy observed between the logging values of the formation parameters and the values which will be observed in a vertical borehole. Since the valuation of the log parameters in terms of the presence or absence of minerals and the like require a standard of comparison, it would be desirable to eliminate or compensate for the effect during the logging operation.

Furthermore, it is oftentimes useful to provide integrated logging measurements, wherein a series of measurements are summed together to provide a measure of some parameter, for example, acoustic velocity, from some point in the earth to the surface. The integrated log can then be compared with a surface measurement. For example, integrated acoustic velocity travel time correlates with seismic measurements and integrated density correlates with gravity surveys. However, when the borehole is deviated from vertical, the integrated parameters do not indicate true depth measurements and, thus, there will be an innate error associated with correlating the downhole measurement with the surface measurements such as the seismic and gravity surveys.

Further, if the log parameter is influenced by anisotropy the integrated parameter will also vary from that which would be obtained in a vertical borehole.

It is, therefore, a primary object of this invention to provide a well logging system which compensates for deviations of the bore hole from a vertical line.

It is still another object of the invention to provide a well logging system which provides an improved method for integrating well logging parameters.

It is still another object of the invention to provide an apparatus which provides true depth correlated well logging measurements.

The objects of the invention are accomplished, broadly, by a well logging system wherein an inclinometer is positioned in the well logging housing, thus providing an indication of the deviation of the bore hole from a vertical line which can be correlated with any given well logging parameter. In the preferred embodiment, a trigonometric function of the angle of deviation, $\theta$, for example, the cosine of the angle $\theta$, is coupled to the surface electronics by way of the downhole tool support cable. The logging parameters, as well as the depth measurement, are taken at predetermined intervals and operated upon by the trigonometric function. Thus, for example, the depth measurement is multiplied by the cosine of the angle $\theta$, resulting in a true vertical depth measurement. This is due to the relationship of $D = d \cos \theta$, where $D$ is the true vertical depth and $d$ is the measured inclined depth. As will become apparent in the detailed specification which follows herein, there are several different ways in which the trigonometric function which is derived from the inclinometer can be used according to the principles of the invention. In one embodiment, wherein an integrated log is desired, the individual measurements of the cosine of the angle $\theta$ are coupled into circuitry which also has as an input the logging parameter, the output of the circuitry being the product of the two. The output is then coupled into electronic circuitry which also has as an input the inclined depth measurement. The output of this latter electronic circuitry is an integrated form of all the individual cosines and the well logging parameter as well as the inclined depth measurement.

The system utilizes conventional well logging or measuring devices, such as those which measure acoustic velocity, neutron lifetime, resistivity or the like. In addition, information relating to the depth of the well is obtainable from a synchro transmitter driven directly from the well equipment cable so as to provide a continuous indication of the depth of the subsurface equipment. All of these indications are normally recorded on graphs with the depth constituting the length coordinate of the chart paper and the other information being displayed as amplitude displacements transverse to the direction of movement of the graph. In order to determine the true depth of the well, rather involved mathematical computations are required. The computation relating to true depth is determined by the equation $$\text{True depth} = \Sigma \Delta d \cos \theta \quad (1)$$

where $\Delta d$ is the depth increment (measured along the well bore) and $\theta$ is the angle of deviation of the well bore from the vertical applicable to the depth increment. In order to obtain the summation required by Equation 1 by graphical methods, it is necessary to determine the angle of the well with respect to vertical at a number of closely spaced points along the aforesaid graph, look up the cosine of the angle for each of these points and compute the value of the vertical components of each of the incremental depths between each measurement by multiplying each incremental depth by the cosine of the angle. Thereafter, all of these incremental values are summed to determine the true depth of the well. Obviously, such a computation is tedious and the probability of error is quite large.

It is, therefore, another object of the invention to overcome the problems related with the logging of inclined boreholes.

These and other objects, features and advantages of the invention will become apparent to one skilled in the art from a reading of the following detailed description and drawings wherein.

Figure 1:
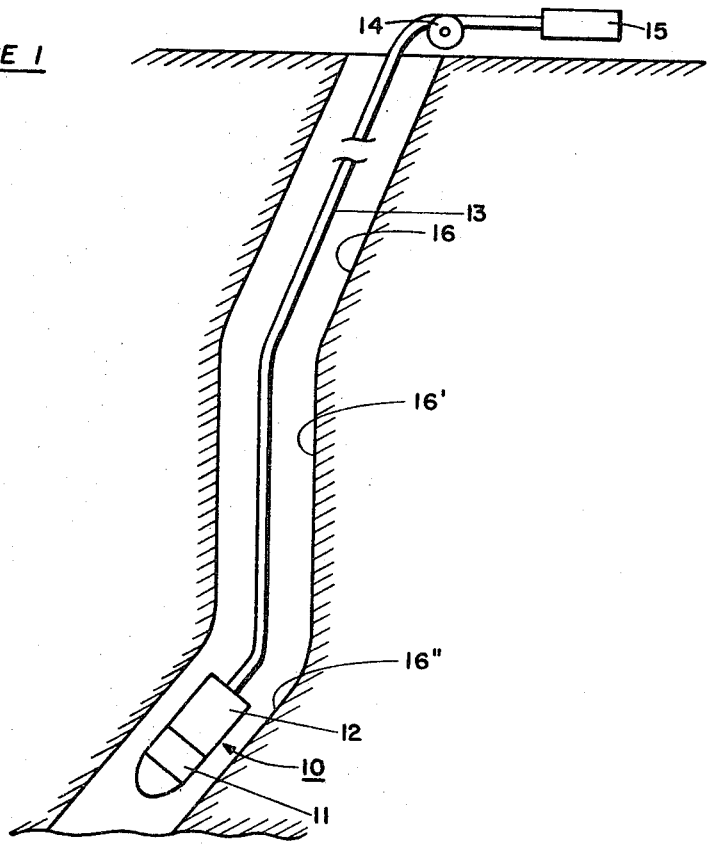
FIGURE 1 is a schematic representation of the apparatus according to the invention in use within an inclined borehole.

Referring first to FIGURE 1, there is shown at 16 a well bore which is to be logged according to the system of the invention. The apparatus for conducting the log includes a vertically elongated instrument 10 which is lowered into the well on a flexible cable or a wire line 13, the instrument being lowered or raised by a motor-driven rotation of a drum 14 about which the wire line 13 is wound at the surface of the earth. The cable 13 is connected to the surface electronics 15. As is illustrated, the borehole 16 has a typical vertical portion 16' and an inclined portion 16''.

The instrument 10 contains conventional logging equipment 11, for example, acoustic velocity apparatus such as is described in U.S. Patent No. 3,018,839 of Walter P. Isaacson, assigned to the assignee of the present invention, or conventional neutron lifetime logging equipment such as is described in copending patent application Ser. No. 435,698 of Arthur H. Youmans, filed June 10, 1954, now U.S. Patent No. 3,379,884, and co-pending patent application Ser. No. 292,927 of Arthur H. Youmans, filed July 5, 1963, now U.S. Patent No. 3,379,882, both of which are assigned to the assignee of the present invention. Likewise, the logging equipment 11 could be other well-known well logging apparatus such as resistivity, induction, density equipment or the like. The conventional inclinometer 12 is also coupled through the cable 13 to the surface electronics 15 such that a voltage signal is developed in the surface electronics 15 indicative of the angle of inclination of the borehole 16 from a true vertical line.

Figure 2:
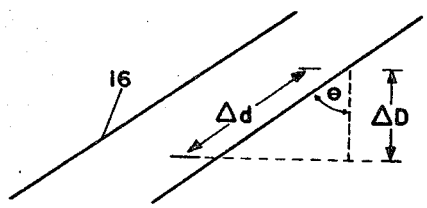
FIGURE 2 is a schematic representation of the angular deviation of a borehole.

FIGURE 2 illustrates schematically how the borehole 16 is deviated from a vertical line by an angle of deviation $\theta$, wherein the inclined distance increment is represented by the $\Delta d$ and the vertical depth increment is indicated by $\Delta D$.

Figure 3:
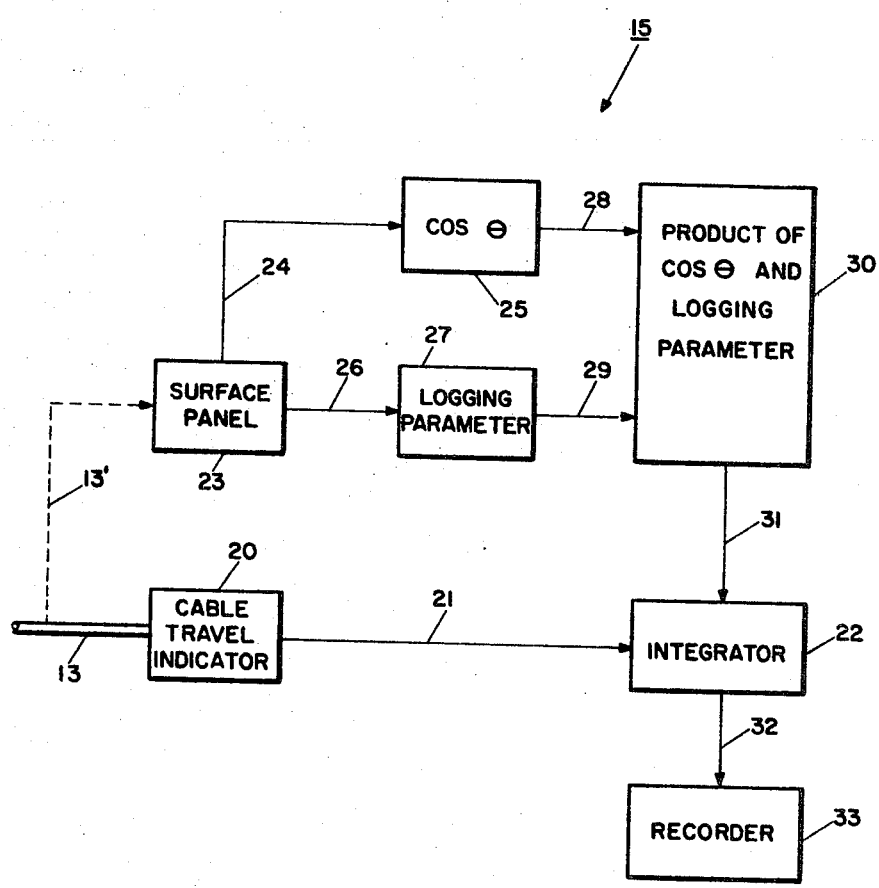
FIGURE 3 is a schematic representation of the surface electronics according to the invention.

FIGURE 3 illustrates in block diagram the electronics surface circuitry 15. The cable 13 is connected into a cable travel indicator 20, the travel indicator 20, for example, as set forth in the co-pending U.S. application Ser. No. 577,345, filed Sept. 6, 1966, and assigned to the assignee of the present invention, being a conventional apparatus well known in the art such that an electrical signal is derived from the travel of the drum 14 of FIGURE 1 and coupled from the box 20 through line 21 into the integrator circuit 22 to provide an indication of the amount of cable travel. The logging parameter information from the apparatus 11 of the downhole instrument 10 is coupled through cable 13, being indicated as the dotted line 13', into the surface panel 23. The signal from the inclinometer 12 is also coupled through line 13' into the surface panel 23 and is taken from line 24 into the cos $\theta$ block 25. The logging parameter per se, for example, acoustic velocity travel time, is coupled through line 26 into the logging parameter square 27 and is then coupled into the circuitry 30 through line 29. Although product (multiplier) circuits are well-known in the art, examples of multiplier circuits are set forth in Chapter 6 of the publication Electronic Analog Computers by G. A. Korn and T. M. Korn, published in 1956 by the McGraw-Hill Book Co., Inc. The cosine of the angle of deviation $\theta$ is coupled through line 28 into the same circuitry 30. The output of circuitry 30, being the product of the cosine $\theta$ and of the logging parameter, is coupled through line 31 into the integrator circuit 22, such an integrator circuit being set forth, for example, in U.S. Patent No. 2,905,258 to R. A. Broding, issued on Sept. 22, 1959. The output of integrator circuit 22 is coupled through line 32 into the conventional recorder 33, for example, a film strip recorder. Thus, it should be appreciated that the output as seen at line 32 and at the recorder 33 represents:

$$T = \sum_{d=0}^{d=D} t \cos \theta$$

where T equals the integrated parameter, for example, a total acoustic velocity travel time, $\theta$ equals the angle of deviation for any given measurement, $d$ equals a given inclined depth measurement, $t$ equals the acoustic travel time per unit of borehole length, $D$ equals the total inclined depth measurement.

Figure 9:
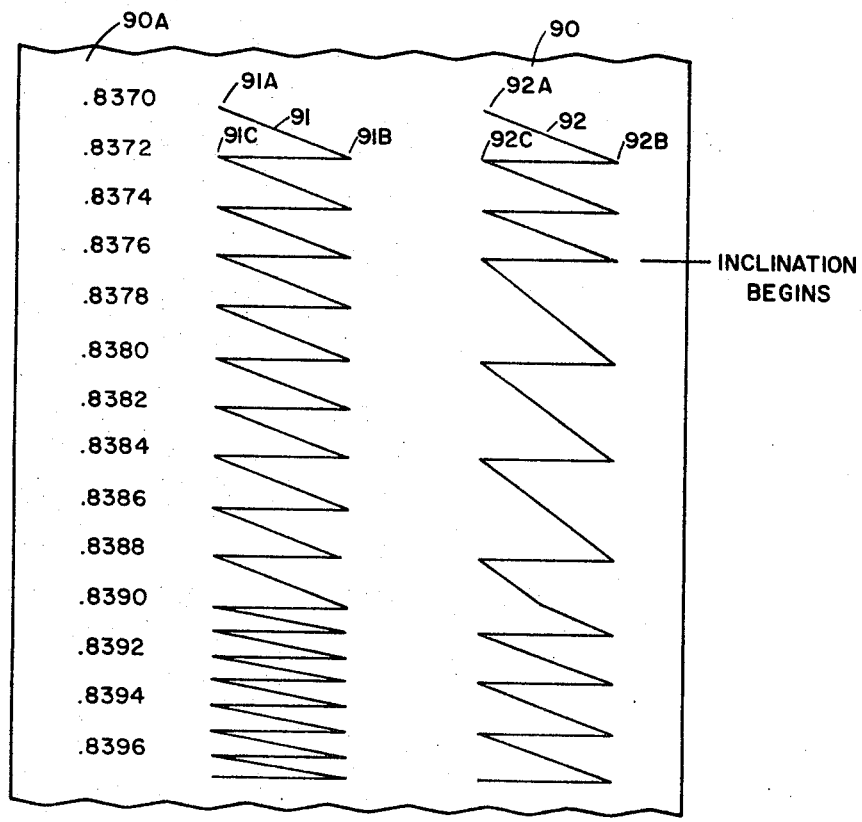
FIGURE 9 illustrates a well log wherein a parameter is integrated for true vertical depth according to the invention.

It should be appreciated that in the system described in FIGURE 3, a logging parameter measurement, for example, an acoustic velocity travel time, is multiplied by the cosine of the angle of deviation $\theta$, and the sum of all these products produces an integrated logging parameter which is correlated with true vertical depth, the sum and the true vertical depth both being indicated at the recorder. FIGURE 9 illustrates a portion 90 of a typical log which is produced by the system described in FIGURE 3. The inclined depth measurement is indicated at 90A, there being no correction made for the angle of deviation to the depth itself. The conventional integrated log 91, for example, acoustic velocity travel time, is illustrated as beginning at a point 91A, advancing in amplitude until a predetermined amplitude 91B is reached, after which the trace drops back to the beginning point 91C. For purposes of illustrating the invention, the bore hole of which this log has been run is substantially vertical from the surface until 8,376 feet, shown as being the point at which the inclination begins. It should be appreciated that, in dealing with logs of this type, the operator counts the number of peaks (91B) to arrive at the total inegrated time. However, the peaks could also be coupled into conventional electronics to count the peaks. The strata as plotted by the trace 91 is fairly homogeneous until approximately 8,390 feet, at which point the acoustic velocity increases for a given increment of measurement. Trace 92 is indicative of the same information as trace 91, except for having been processed through the system according to FIGURE 3. Since the bore hole is vertical until 8,376 feet, the first three portions of the two traces 91 and 92 are identical, the cosine of zero degrees being equal to one. Trace 92 begins at 92A, advances to 92B and then returns to 92C. However, at 8,376 feet, the point at which the bore hole begins to deviate from a vertical line, the logging parameter has been multiplied by the cosine $\theta$, thus resulting in a decreased integrated travel time. As the downhole instrument passes 8,390 feet, the integrated parameter is increased at a faster rate, but nonetheless is observed to increase less than the conventional trace 91. While FIGURE 9 illustrates both the conventional trace 91 and the depth-corrected trace 92 on the same log, it should be appreciated that they can be run on separate logs. Likewise, it should be appreciated that the depth marks 90A could be corrected by the cosine $\theta$ and thus remove the necessity of correcting the trace 91. Furthermore, it should be appreciated that the integrated log can also be run using the techniques more fully described with respect to FIGURES 4 and 5, wherein the recorder drive mechanism is proportional to the cosine $\theta$.

If it were known that the particular formations being logged, as in the foregoing example, might be expected to exhibit an anisotropy factor $A$, then at each depth the log parameter would be larger than for a vertical borehole by the factor $1+(A-1)\sin\theta$. It should be apparent, therefore, that additional circuitry could be provided to alter the log parameter in accordance with this factor in addition to the aforedescribed depth correctors. It should be appreciated that anisotropy varies with the type of formation, so the factor has to be programmed in advance or else varied by the operator in accordance with prearranged plans. Probably an approximate average could be used for $A$. Anisotropy is known to influence several of the well logging parameters, included in which are acoustic velocity and resistivity measurements. The following table provides some representative strata for demonstrating the anisotropy factor $A$.

Table 1

| Stratum: | A |
| --- | --- |
| Sandstone | 1.00 |
| Salt | 1.00–1.05 |
| Limestone | 1.08–1.12 |
| Anhydrite | 1.15–1.20 |

It should be appreciated that while Table 1 is only representative of anisotropy factors for lithologic types in northern Sahara wells, such factors are either known or can be determined for the different lithologies in other parts of the world.

Figure 4:
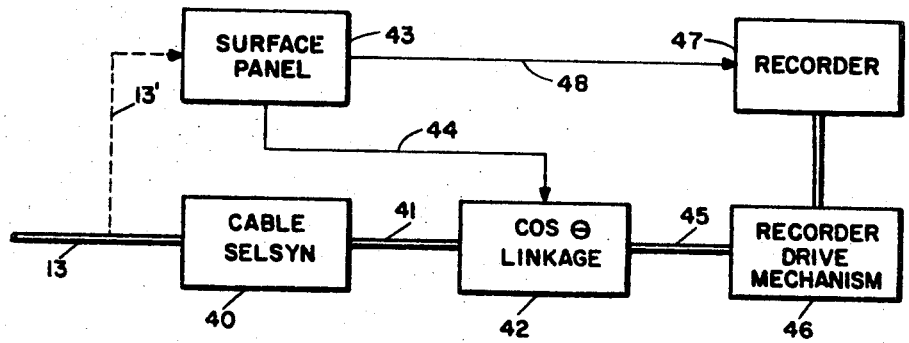
FIGURE 4 is a schematic representation of a second embodiment according to the invention.

FIGURE 4 illustrates another embodiment of the invention. The support cable 13 is connected to a conventional cable selsyn, which is then coupled into a mechanical cosine $\theta$ linkage 42. The logging parameters and also the voltage indication from the inclinometer 12 are coupled through dotted line 13' into the surface panel 43. The cosine $\theta$ voltage is coupled through line 44 into the cosine $\theta$ linkage 42, whereas the logging parameter is coupled from surface panel 43 through line 48 into the recorder 47. The cosine $\theta$ linkage is coupled through line 45 into the recorder drive mechanism 46 and on into the recorder 47.

Figure 5:
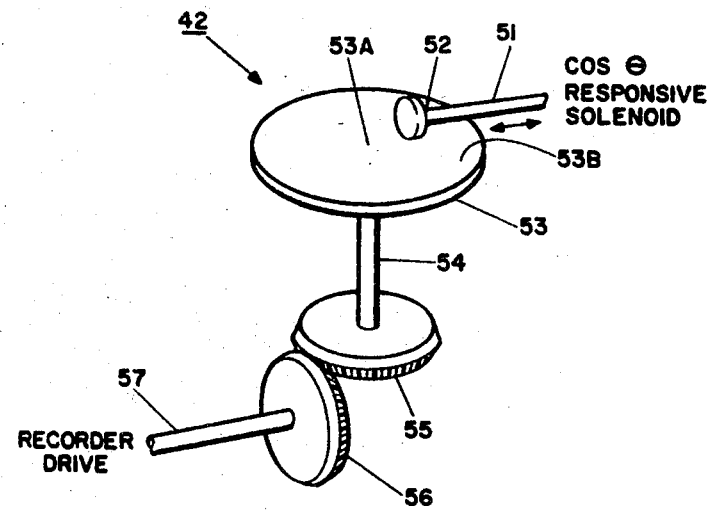
FIGURE 5 is a pictorial representation of a segment of the mechanical linkage according to the second embodiment of the invention.

FIGURE 5 illustrates one simple example for the cosine $\theta$ linkage 42, wherein a cosine $\theta$ responsive solenoid (not illustrated) is coupled through line 51 to a disc 52. As indicated, the shaft 51 has a back and forth travel dependent upon the voltage corresponding to the cosine $\theta$. The disc 52 is in contact with another disc 53, there being a frictional surface between the disc 52 and disc 53. It should be appreciated that as the disc 52, rotating at a constant speed, is moved toward the center of the disc 53, such as at point 53A, the disc 53 will rotate faster, whereas when the disc 52 moves to the edge of disc 53, and as marked 53B, the disc 53 will rotate slower. The disc 53 is coupled through spindle 54 into the bevel gears 55 and 56, into the recorder drive spindle 57 which is connected into the recorder drive. It should be appreciated that the apparatus of FIGURE 5 is merely illustrative of means which provide a mechanical analog of a cosine proportional voltage and other means can be used, such as conventional variable speed gear systems. Such systems including, for example, a motor-gearbox combinations having a D.C. shunt motor whose speed is related to the voltage applied to the armature.

Figure 6:
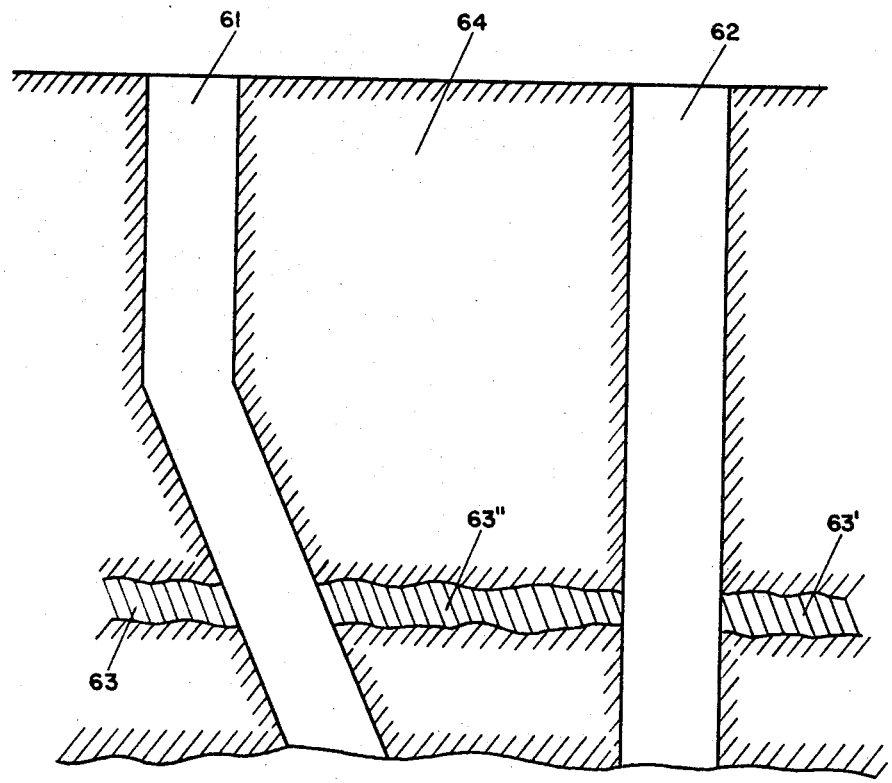
FIGURE 6 is a pictorial representation of a pair of boreholes within which the system according to the invention finds utility.

FIGURE 6 illustrates how bore holes are quite often drilled adjacent in oilfields. Bore hole 61 and bore hole 62 are shown in the earth 64, both of which traverse through a region 63. As is illustrated, bore hole 61 has an angle of deviation from a vertical line. In the prior art systems, conventional well logging equipment would indicate the region 63 as appearing at a given depth in the bore hole 61, whereas the same logging equipment in the bore hole 62 would indicate the strata 63' as occurring at some lesser depth. Thus, it would not be readily apparent to an observer of the two logs that the strata 63 and 63' are on a substantially horizontal plane. Likewise, it would not even be apparent that the strata 63 and 63' are joined together by the strata 63''. That is, the strata or reservoir 63 would appear to be at a greater depth than the strata or reservoir 63' because of the angle of deviation.

In the operation of the system above illustrated, it should be appreciated that in a logging system which incorporates the angle of inclination with the conventional well logging parameter, for example, acoustic velocity travel time, a log of two bore holes, for example, bore hole 61 and bore hole 62, would indicate to an observer that the strata 63, 63'' and 63' are all on a substantially horizontal plane, since the log of the deviated bore hole 61 has compensation for the angle of deviation.

Figure 7:
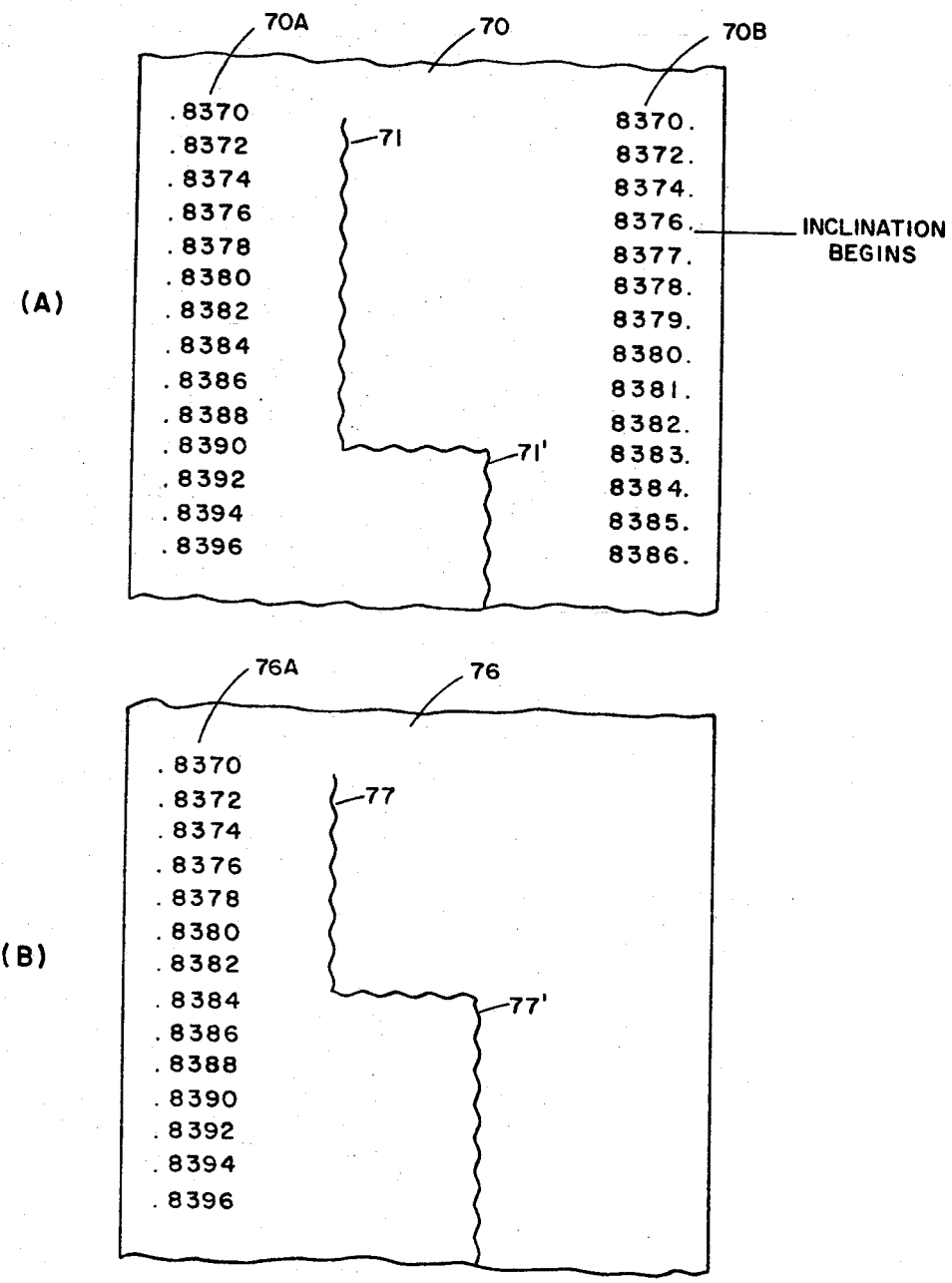
FIGURE 7 (A and B) illustrates a pair of well logs according to the invention.

FIGURE 7 illustrates a pair of logs conducted on the same bore hole. FIGURE 7A shows a log chart 70 which has the inclined depth marks 70A on the left hand side of the chart and the corrected depth marks 70B on the right hand side, the marks 70B being representative of the product of the cosine of the angle of deviation and the inclined depth measurement. The trace 71 of a conventional well logging parameter is illustrated as being fairly uniform until 8,390 feet on the depth marks 70A. However, the true vertical depth marks 70B indicate that the sudden change in strata occurs at a true vertical depth of 8,383 feet, the trace then being identified as 71'. FIGURE 7B illustrates a similar parameter on a chart 76, except the corrected depth marks 76A are the only depth marks which appear on the logs. The log trace 77 is shown to sharply change at a true vertical depth of 8,383 feet, the change in trace being identified as 77'.

Figure 8:
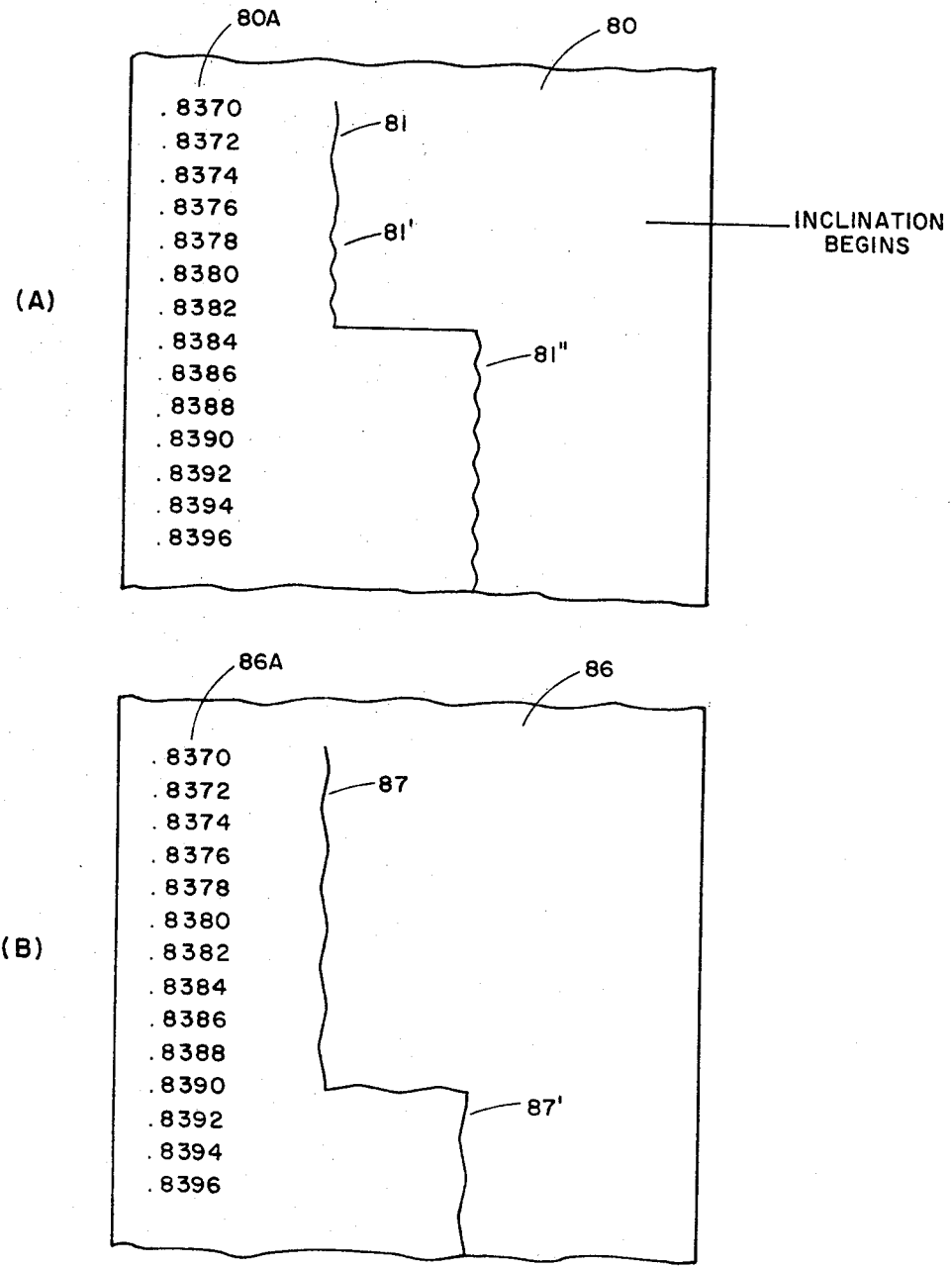
FIGURE 8 (A and B) illustrates a pair of well logs according to another embodiment of the invention.

FIGURE 8 illustrates a pair of logs conducted on the same bore hole as that described in FIGURE 7, but in which FIGURE 8A represents a log made according to the system of FIGURE 4. While the depth marks 80A on the chart 80 are spaced according to the inclined depth, the film strip 80 is driven by mechanical cosine θ linkage. Thus, the trace 81 is seen to "crowd up" at 81' (the beginning of bore hole inclination). Since the chart 80 is being driven slower than the inclined bore hole tool, the trace 81" will thus appear to occur at a true vertical depth of 8,383 feet. FIGURE 8B illustrates a conventional log of the same bore hole, wherein the trace 87 does not jump at 87' until 8,390 feet, thus giving a false depth indication from the depth chart 86A.

It should further be appreciated that even when drilling a single bore hole, compensation for the angle of deviation enables the observer to easily determine the thickness of a given strata. This is important when the decision is being made as to whether a well should be perforated, in that a thickness of the strata provides an indication of the volume of oil which might be expected to be forthcoming from a given formation.

Thus, there has been illustrated and described an improved well logging system which compensates for the angle of deviation from a true vertical line and the conventional well logging parameters are thus correlated with the corrected depth measurement. It is anticipated that in the practice of the invention, logging operators may desire to run two simultaneous logs, one showing the uncorrected depth measurement and one showing the corrected depth measurement. As an alternative measure, the uncorrected depth measurement could be indicated on one side of the chart and the corrected depth measurement could be indicated on the other side of the logging chart. Furthermore, the operators might desire to run two logs when using the embodiment described herein, one which utilizes mechanical cosine linkage to drive the film strip recorder, while one of the logs is driven at constant speed, the first log being driven such that as the angle of deviation increases the speed of the filmstrip drive is decreased.

What is claimed is:
1. A method for logging an inclined earth bore hole comprising:
   (a) logging said bore hole at predetermined intervals, whereby a series of logging measurements are produced;
   (b) measuring the angle of inclination of said bore hole at each of said intervals; and
   (c) mechanically driving a logging recording mechanism as a function of the cosine of the angle of inclination at which each of said logging measurements is made, whereby said logging measurments are recorded as a function of substantially true vertical depth.
2. The method according to claim 1 including the additional step of integrating said logging measurements prior to said recording.

References Cited

UNITED STATES PATENTS

| | | | |
|---|---|---|---|
| 2,547,876 | 4/1951 | Krasnow | 181—.5 |
| 2,905,258 | 9/1959 | Broding | 181—.5 |
| 3,175,638 | 3/1965 | Hubbard et al. | |
| 3,252,131 | 5/1966 | Vogel. | |
| 3,275,983 | 9/1966 | Kaneko. | |

BENJAMIN A. BORCHELT, *Primary Examiner.*

J. FOX, *Assistant Examiner.*

U.S. Cl. X.R.

340—18